(12) United States Patent
Atsuchi et al.

(10) Patent No.: US 9,090,217 B2
(45) Date of Patent: Jul. 28, 2015

(54) STORAGE PART STRUCTURE FOR SADDLE TYPE VEHICLE

(71) Applicant: HONDA MOTOR CO., LTD., Tokyo (JP)

(72) Inventors: Michio Atsuchi, Wako (JP); Yoji Komatsu, Wako (JP); Takashi Doi, Wako (JP); Takasumi Yamanaka, Wako (JP); Nobuaki Kinoshita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/926,590

(22) Filed: Jun. 25, 2013

(65) Prior Publication Data

US 2014/0060945 A1 Mar. 6, 2014

(30) Foreign Application Priority Data

Aug. 28, 2012 (JP) .................................. 2012-187254

(51) Int. Cl.
| B62J 7/02 | (2006.01) |
| B60R 16/04 | (2006.01) |
| H01M 2/10 | (2006.01) |
| B62K 19/46 | (2006.01) |
| B60R 7/02 | (2006.01) |

(52) U.S. Cl.
CPC ................. B60R 16/04 (2013.01); B62K 19/46 (2013.01); H01M 2/1083 (2013.01); B60R 7/02 (2013.01); B62K 2202/00 (2013.01)

(58) Field of Classification Search
CPC ...... B60R 16/04; H01M 2/1083; B62K 19/46
USPC .............. 180/68.5; 296/37.1, 37.15; 224/425
See application file for complete search history.

(56) References Cited

U.S. PATENT DOCUMENTS

| 6,186,256 | B1 * | 2/2001 | Dignitti ......................... 180/68.5 |
| 6,357,542 | B1 * | 3/2002 | Sako ............................. 180/68.5 |
| 6,499,784 | B2 * | 12/2002 | Takahashi ..................... 296/37.1 |
| 7,134,706 | B2 * | 11/2006 | Michisaka et al. ......... 296/97.22 |
| 7,562,734 | B2 * | 7/2009 | Yano et al. ..................... 180/219 |
| 7,794,002 | B2 * | 9/2010 | Yano et al. ................. 296/37.15 |
| 2010/0163328 | A1 * | 7/2010 | Hasegawa ..................... 180/225 |

FOREIGN PATENT DOCUMENTS

| CN | 201777336 U | * | 3/2011 |
| CN | 201841927 U | * | 5/2011 |
| CN | 201890306 U | * | 7/2011 |
| EP | 1 961 648 A2 |   | 8/2008 |
| EP | 2 223 849 A2 |   | 9/2010 |

(Continued)

*Primary Examiner* — J. Allen Shriver, II
*Assistant Examiner* — Steve Clemmons
(74) *Attorney, Agent, or Firm* — Birch, Stewart, Kolasch & Birch, LLP

(57) ABSTRACT

In a storage part structure for a saddle type vehicle including a storage box and a battery box it is possible to easily detach a battery box to enhance maintenance. The storage part structure for the saddle type vehicle includes the storage box and the battery box formed as a body separate from the storage box and fixed to the storage box. In the storage part structure, the battery box is disposed under the storage box with a horizontal part cross member constituting a body frame being disposed under the battery box. In addition, the battery box is mounted on the horizontal part cross member.

11 Claims, 17 Drawing Sheets

(56) References Cited

FOREIGN PATENT DOCUMENTS

| | | | | |
|---|---|---|---|---|
| FR | 2722755 B1 | * | 10/1998 | ............... B62J 11/00 |
| GB | 2432878 A | * | 6/2007 | ............... H01M 2/10 |
| JP | 06183383 A | * | 7/1994 | ............... B62J 15/00 |
| JP | 2000280951 A | * | 10/2000 | ............... B62J 9/00 |
| JP | 2010076538 A | * | 4/2010 | |
| JP | 2010149803 A | * | 7/2010 | |
| JP | 2011063179 A | * | 3/2011 | |
| JP | 4875053 B2 | | 2/2012 | |

* cited by examiner

STORAGE PART STRUCTURE FOR SADDLE TYPE VEHICLE

CROSS-REFERENCE TO RELATED APPLICATIONS

The present application claims priority under 35 USC 119 to Japanese Patent Application No. 2012-187254 filed Aug. 28, 2012 the entire contents of that are hereby incorporated by reference.

BACKGROUND OF THE INVENTION

1. Field of the Invention

The present invention relates to a storage part structure for a saddle type vehicle that includes a storage box and a battery box.

2. Description of Background Art

A storage part structure for a saddle type vehicle is known that includes a storage box that is opened and closed with a seat. A battery box for storing a battery therein is formed as a separate body from the storage box and is fixed to the storage box. See, for example, Japanese Patent No. 4875053.

In the storage part structure for a saddle type vehicle according to the related art, the configuration is based on the presumption that the storage box is attached to and detached from the vehicle body together with the battery box integrally mounted to the storage box. Thus, when detaching the storage box from the vehicle body during maintenance, inspection or the like, the battery has to be simultaneously detached together with the battery box that is integral with the storage box. This causes a troublesome operation, especially in the cases of maintenance or the like that has to be performed with the electric power being supplied from the battery.

SUMMARY AND OBJECTS OF THE INVENTION

The present invention has been made in consideration of the above-mentioned circumstances. Accordingly, it is an object of an embodiment of the present invention, to provide a storage part structure for a saddle type vehicle that includes a storage box and a battery box, to facilitate detachment of the battery box and to enhance maintenance.

In order to attain the above object, according to an embodiment of the present invention, there is provided a storage part structure for a saddle type vehicle, including a storage box (80) and a battery box (77) formed as a body separate from the storage box (80) and fixed to the storage box (80). The battery box (77) is disposed under the storage box (80) with a cross member (18) constituting a body frame (F) being provided under the battery box (77) and with the battery box (77) being mounted on the cross member (18).

According to an embodiment of the present invention, the battery box is mounted on and supported by the cross member of the body frame. Therefore, the battery box can be separated from the storage box for performing disassembly. Thus, the storage box can be solely detached without detaching the battery during maintenance and inspection. In other words, the battery box can be easily detached from the storage box to enhance maintenance.

According to an embodiment of the present invention, the storage box (80) and the battery box (77) are fixed by a fastening member (85). Fixation by the fastening member (85) can be performed from the side of an opening (80C) of the storage box (80).

According to an embodiment of the present invention, fixation by the fastening member can be released by an operation from the side of the opening of the storage box, whereby workability in detaching the battery box can be enhanced.

According to an embodiment of the present invention, the storage part structure for the saddle type vehicle includes a positioning part (91) for positioning the battery box (77) and the cross member (18).

According to an embodiment of the present invention, there is no need to provide a fastening part for fixing the battery box to the cross member. Thus, the assembly of the invention can be enhanced.

According to an embodiment of the present invention, the battery box (77) has a guide part (94, 95) formed so as to be fitted to the storage box (80) from outside of the storage box (80), the guide part (94, 95) being slanted down toward the center of the battery box (77).

According to an embodiment of the present invention, the battery box can be fitted to the storage box while easily positioning it by the guide part. Consequently, a higher working efficiency in fixing the battery box to the storage box can be contrived.

According to an embodiment of the present invention, a contact part of the battery box (77) for contact with the cross member (18) is formed as a bulging part (89) bulging to below a battery box bottom wall (86) contacted by a battery (90). A piping or wiring (107) is passed inside the bulging part (89) in the manner of traversing the bulging part (89) in a vehicle width direction.

According to an embodiment of the present invention, by making the shape of the bulging part correspond to the shape of the cross member, it is possible to easily mount the battery box. In addition, it is possible to mount the battery box on the cross member with a simple structure, and to secure a large storage space for the battery. Further, the piping or wiring can be laid while effectively utilizing the dead space in the bulging part. Thus, the vehicle can be made compact.

According to an embodiment of the present invention, a fuel tank (40) is disposed forwardly of the battery box (77) and adjacent to the battery box (77).

According to an embodiment of the present invention, forward tilting of the battery box can be prevented by the fuel tank, so that the mounting or assembling operation can be enhanced.

According to an embodiment of the present invention, an engine (E) is disposed rearwardly of the battery box (77) adjacently to the battery box (77).

According to an embodiment of the present invention, rearward tilting of the battery box can be prevented by the engine, so that working during a mounting or assembling operation can be enhanced.

In the storage part structure for a saddle type vehicle according to an embodiment of the present invention, the battery box can be separated from the storage box for performing disassembly. The storage box can be solely detached, without detaching the battery and with the battery box left in position, at the time of maintenance and inspection. Therefore, maintenance can be enhanced.

In addition, fixation by a fastening member can be released by an operation from the side of the opening of the storage box. Thus, detaching the battery box can be enhanced.

In addition, it is unnecessary to provide a fastening part for fixing the battery box to the cross member. Thus, the assembling can be enhanced.

Further, the battery box can be fitted to the storage box while easily positioning it by the guide part. Accordingly, a higher working efficiency in fixing the battery box to the storage box can be promised.

The battery box can be easily mounted by making the shape of the bulging part correspond to the shape of the cross member. In addition, the battery box can be mounted onto the cross member with a simple structure. Thus, a large storage space for the battery can be secured. Further, the piping or wiring can be disposed while effectively utilizing the dead space in the bulging part. Thus, the vehicle can be made compact.

Forward tilting of the battery box can be prevented by the fuel tank. Thus, working on a mounting or assembling operation can be enhanced.

Rearward tilting of the battery box can be prevented by the engine. Thus, working on a mounting or assembling operation can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
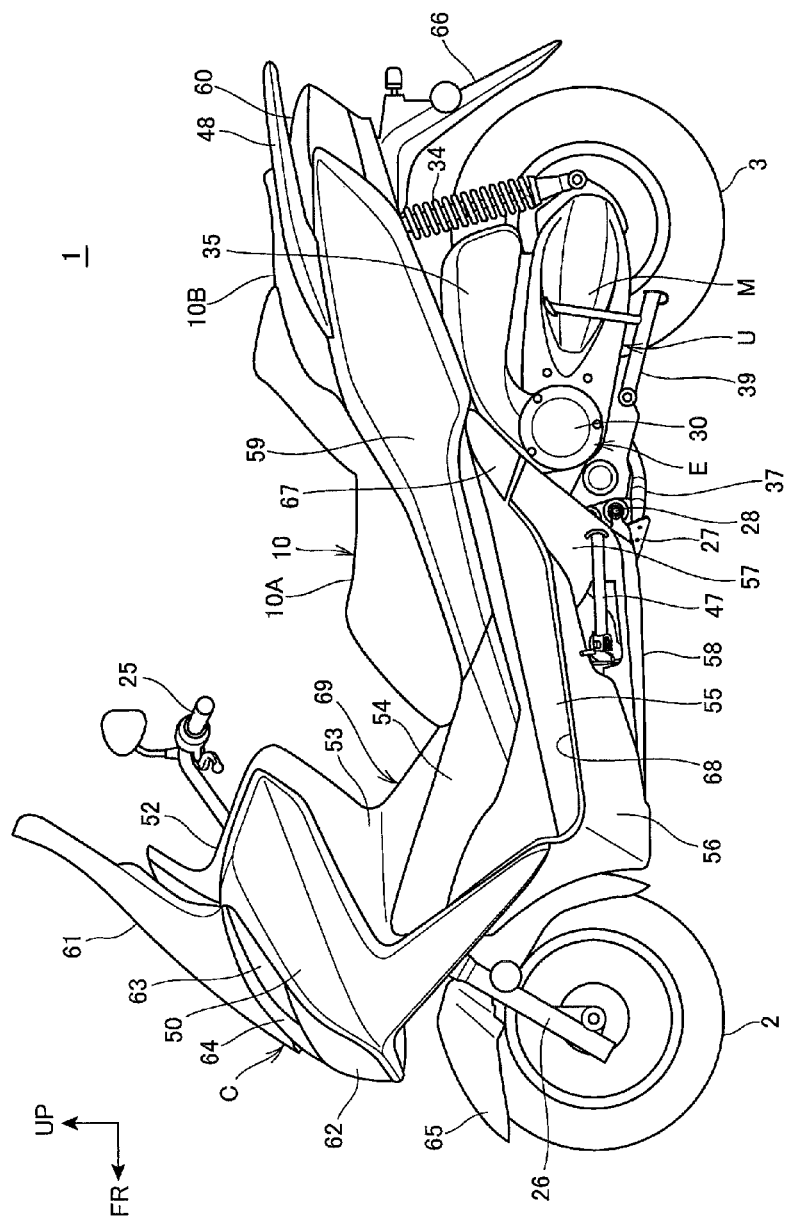
FIG. 1 is a left side view of a motorcycle pertaining to an embodiment of the present invention.

A motorcycle provided with a storage part structure according to an embodiment of the present invention will be described below, referring to the drawings. In the description, the directions such as forward, rearward, leftward, rightward, upwardly and downward directions are the same as those in relation to the vehicle body, unless specified otherwise. In addition, FR in the drawings denotes the front side of the vehicle body, UP the upper side of the vehicle body, and LE the left side of the vehicle.

FIG. 1 is a left side view of a motorcycle pertaining to an embodiment of the present invention.

The motorcycle 1 (saddle type vehicle) is a motor scooter type vehicle having low-floor-type step floors 68 for positioning the feet of a rider seated on a seat 10. A front wheel 2 is provided at the front side of a body frame F (FIG. 2), and a rear wheel 3 as a driving wheel is rotatably supported on a unit swing engine U (unit swing power unit) disposed at a rear portion of the vehicle. The body frame F is covered with a resin-made body cover C.

Figure 2:
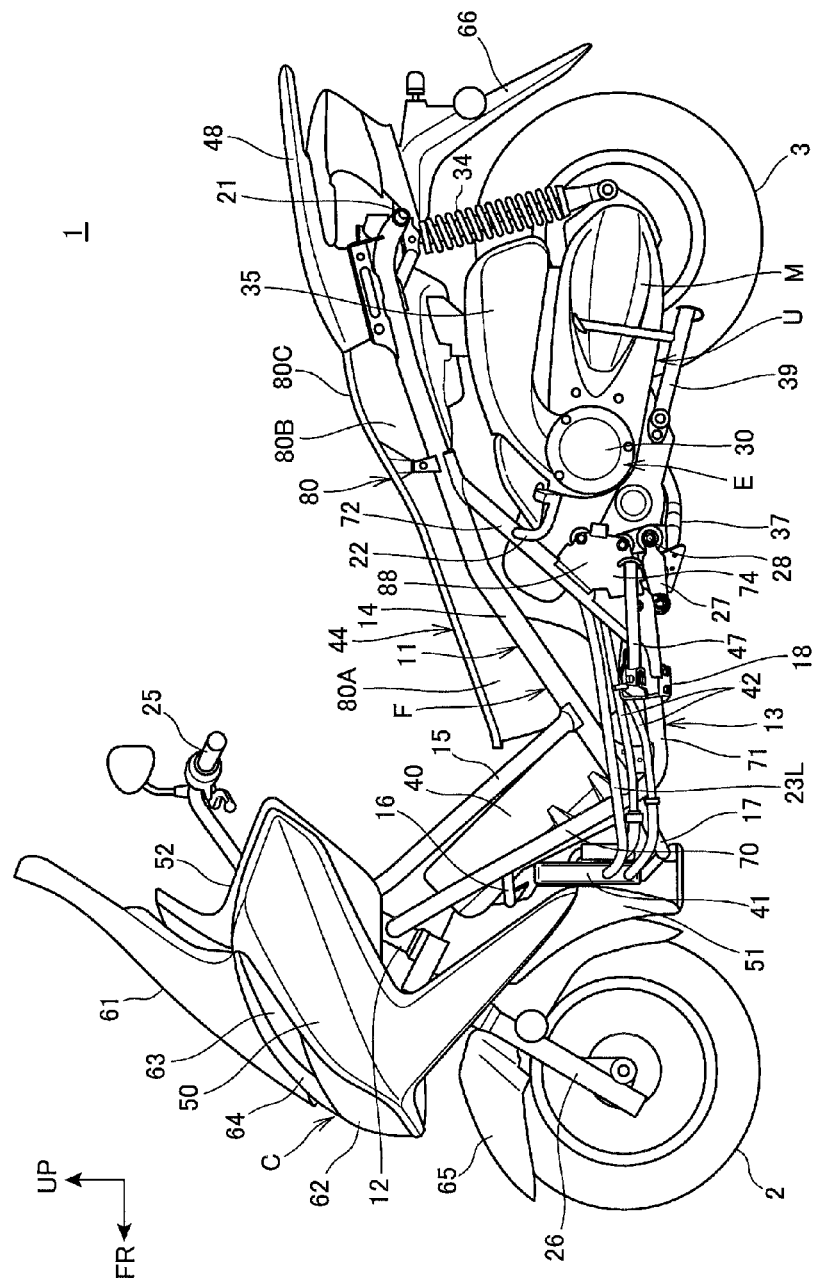
FIG. 2 is a left side view showing an inside structure of the motorcycle.
Figure 3:
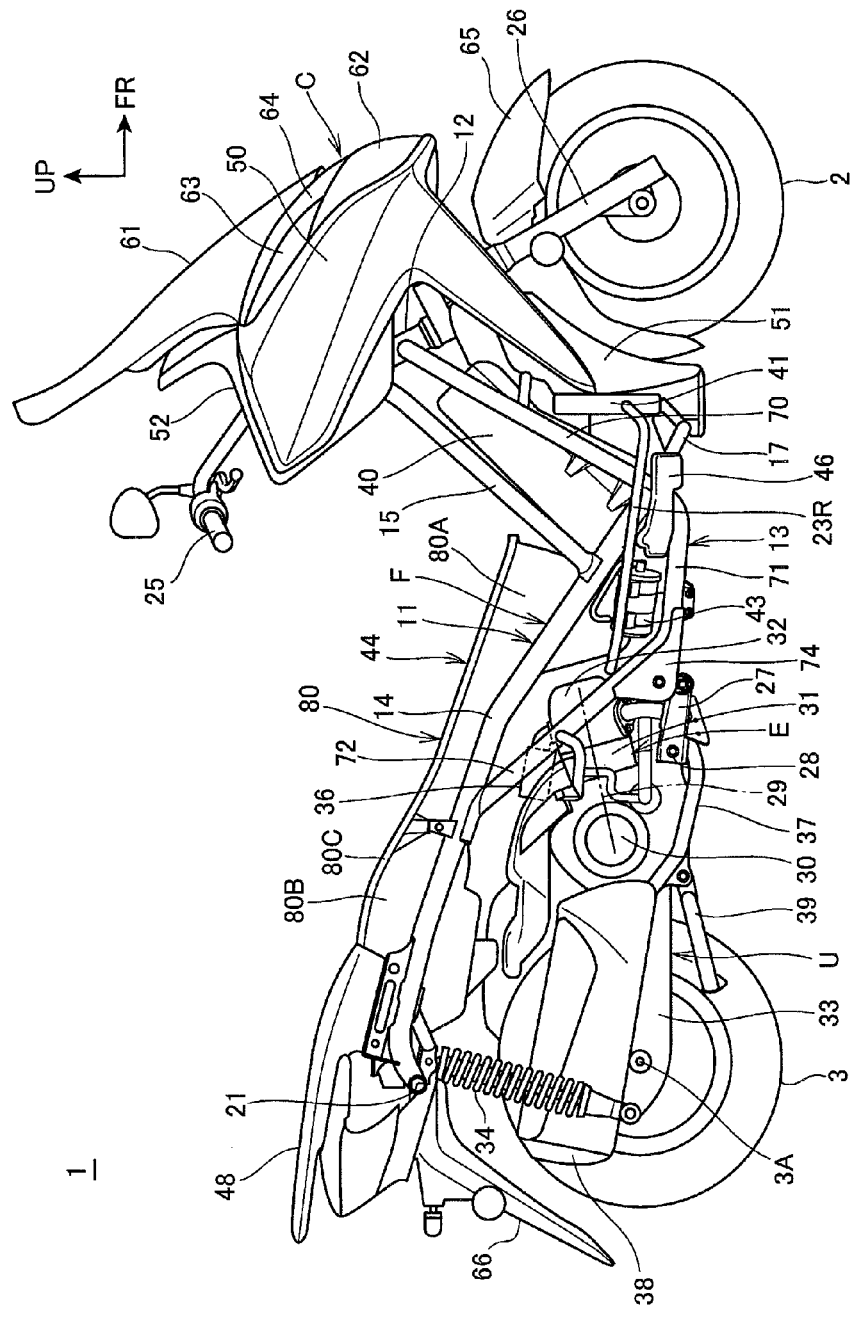
FIG. 3 is a right side view showing an inside structure of the motorcycle.
Figure 4:
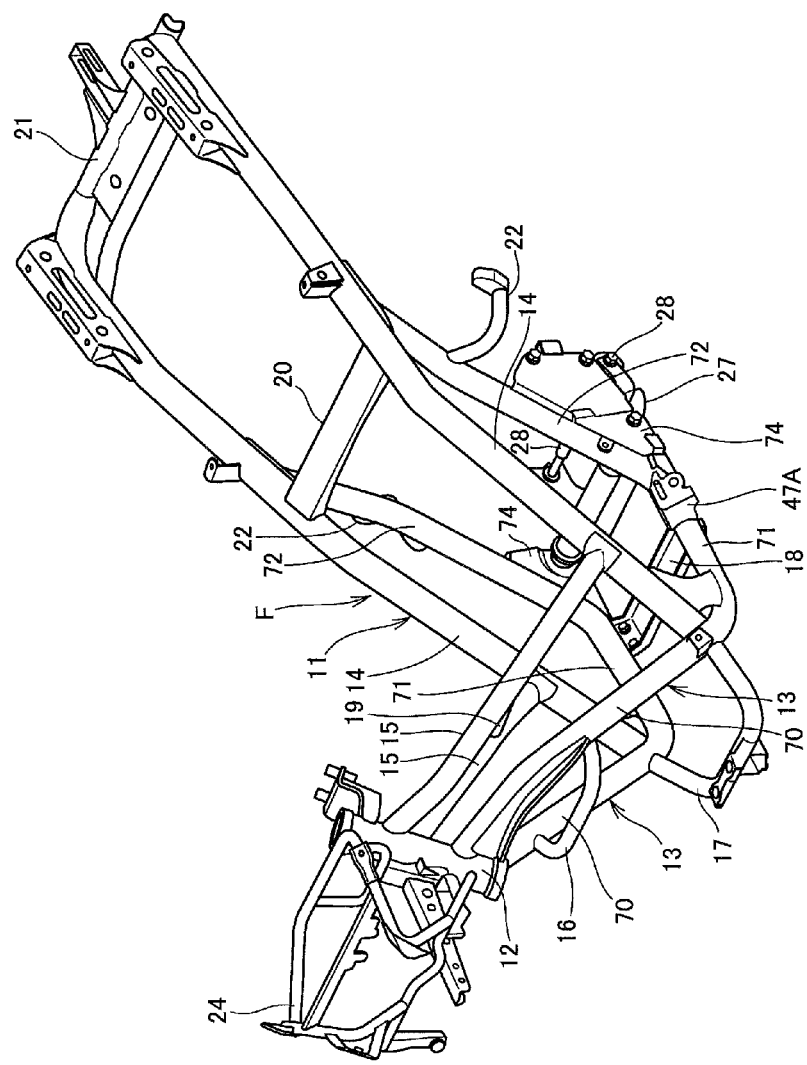
FIG. 4 is a perspective view of a body frame.

FIG. 2 is a left side view showing an inside structure of the motorcycle 1, and FIG. 3 is a right side view showing an inside structure of the motorcycle 1. FIG. 4 is a perspective view of the body frame F. In FIGS. 2 and 3 illustrates a state wherein the body cover C has been partly detached.

As shown in FIGS. 2 to 4, the body frame F is formed by connecting a plurality of metallic tubes and pipes by welding. A main frame 11 includes a head pipe 12 provided at a front portion of the main frame 11; a pair of left and right down tubes 13, 13 extending rearwardly downwardly from the head pipe 12, then extending rearwardly and substantially horizontally, and extending rearwardly upwardly at a rear portion of the main frame 11. A pair of left and right seat rails 14, 14 extend rearwardly and upwardly from lower portions of the down tubes 13, 13 to rear portions of the vehicle. A pair of left and right upper tubes 15, 15 extend from the head pipe 12 rearwardly downwardly over the down tubes 13, 13 to be connected to the seat rails 14, 14.

The down tubes 13, 13 each have a downward extension part 70 connected to the head pipe 12 at its front end and extending rearwardly and downwardly. A horizontal extension part 71 extends rearwardly from the lower end of the downward extension part 70 substantially horizontally. An oblique upwardly extension part 72 extends rearwardly upwardly from the rear end of the horizontal extension part 71.

As shown in FIG. 4, the main frame 11 is provided with cross members wherein left and right frames are interconnected. The cross members include a front upper cross member 16 interconnecting upper portions of the downward extension parts 70, 70 of the down tubes 13, 13; a front cross member 17 interconnecting lower portions of the downward extension parts 70, 70; a horizontal part cross member 18 (cross member) interconnecting the horizontal extension parts 71, 71 of the down tubes 13, 13; an upper cross member 19 interconnecting the upper tubes 15, 15; an intermediate cross member 20 interconnecting the seat rails 14, 14 and a rear part cross member 21 interconnecting rear parts of the seat rails 14, 14. The horizontal part cross member 18 is connected to the horizontal extension parts 71, 71 by bolting.

At upper portions of the oblique upper extension parts 72, 72 of the down tubes 13, 13, there are provided a pair of left and right tandem step stays 22, 22 extending outwardly in the vehicle width direction.

A stand stay 47A for attaching a side stand 47 is provided at an outside surface of the horizontal extension part 71 on the left side, in the vicinity of the horizontal part cross member 18. A cage-like front frame 24 that supports lamps, a body cover C and the like is connected to a front surface of the head pipe 12.

On the outer lateral sides of the main frame 11, a pair of left and right step frames 23L and 23R (FIGS. 2 and 3) are provided that are connected to the down tubes 13, 13, extend in the front-back direction and support the step floors 68 from the lower side.

As shown in FIGS. 1 to 3, a steering system for steering the front wheel 2 has a steering shaft (not shown) turnably supported on the head pipe 12, and a handle 25 connected to an upper portion of the steering shaft. The lower end of the steering shaft is connected to a pair of left and right front forks 26, 26. The front wheel 2 is rotatably supported on the lower ends of the front forks 26, 26, and is steered by an operation of the handle 25.

The unit swing engine U is of a unit swing system wherein an engine E and a transmission case M with a belt-type continuously variable transmission (not shown) housed therein are integrated. The unit swing engine U also functions as a swing arm for supporting the rear wheel 3. The unit swing engine U is connected to rear portions of the down tubes 13, 13 through a link member 27 connected to a front portion thereof, and can be vertically swung about a pivot shaft 28 provided on the link member 27. A pair of left and right power unit support parts 74, 74 for supporting the unit swing engine U through the link member 27 are each formed at a rear surface of each oblique upper extension parts 72.

The engine E is a water-cooled four-cycle single-cylinder engine that includes a cylinder axis 29 extending forward substantially horizontally. The engine E has a cylinder 31 and a cylinder head 32 joined to a front surface of a crankcase 30 disposed at a front portion of the unit swing engine U.

The transmission case M extends rearwardly from a rear portion of the crankcase 30 while passing on the left side of the rear wheel 3. At a rear portion of the crankcase 30, an arm part 33 (FIG. 3) is provided that extends rearwardly while passing on the right side of the rear wheel 3. The rear wheel 3 is supported on an axle 3A provided between a rear portion of the transmission case M and a rear portion of the arm part 33. The output of the engine E is transmitted through the continuously variable transmission to the rear wheel 3.

A pair of left and right rear suspensions 34, 34 are arranged between the rear end of the transmission case M as well as the rear end of the arm part 33 and the seat rails 14, 14.

At an upper surface of the transmission case M, an air cleaner box 35 is provided through which outside air is sucked in. The air cleaner box 35 is connected to a throttle body 36, that is connected to an intake port at an upper surface of the cylinder head 32, through a connecting tube (not shown).

An exhaust pipe 37 connected to an exhaust port at a lower surface of the cylinder head 32 extends rearwardly while passing under the engine E, and is connected to a muffler 38 fixed to an outside surface of the arm part 33.

At the lower portion of a rear portion of the transmission case M, a main stand 39 is provided wherein the vehicle can be supported in an erect posture.

A fuel tank 40 for reserving a fuel for the engine E includes a front surface that is set along the lower extension parts 70 of the down tubes 13 while its rear surface is set along the upper tubes 15, in a side view. In the vertical direction, the fuel tank 40 extends long from the rear side of a lower portion of the head pipe 12 down to the vicinity of the horizontal extension parts 71 of the down tubes 13. The fuel tank 40 is disposed in a forwardly slanted posture between the left and right down tubes 13, 13.

In a space under a front portion of the forwardly slanted fuel tank 40, a plate-formed radiator 41 is provided wherein cooling water for the engine E is cooled. A pair of cooling water pipes 42, 42 interconnecting the radiator 41 and the engine E are led out from a left side portion of the radiator 41, extend rearwardly while passing under the step frame 23L (FIG. 2) on the left side (one side) of the vehicle, and pass on the inside of the down tube 13, to be connected to the engine E.

A reservoir tank 46 for reserving part of the cooling water of the radiator 41 is disposed under the step frame 23R (the step frame on one side) (FIG. 3) on the right side (the other side) of the vehicle, on the rear side of the radiator 41. In addition, a canister 43 for adsorption of an evaporated fuel in the fuel tank 40 is provided under the step frame 23R, on the rear side of the reservoir tank 46.

A storage part 44 for storing articles therein has a box-formed storage box 80 that is disposed between the seat rails 14, 14 and extends from the vicinity of a rear portion of the fuel tank 40 to the upper side of the transmission case M. The storage box 80 extends rearwardly and upwardly along the seat rails 14, 14. The storage box 80 includes a front storage part 80A disposed between the fuel tank 40 and the oblique upwardly extension parts 72 of the down tubes 13, and a rear storage part 80B disposed on the upper side of the unit swing engine U. The front storage part 80A and the rear storage part 80B are integrally formed by resin molding.

An upper surface of the storage box 80 is opened over the whole length thereof on the upper side of the seat rails 14, 14. The opening 80C is opened and closed by the riders' seat 10 (FIG. 1). The seat 10 includes a front seat 10A on which an operator is seated, and a rear seat 10B that is formed to be one step higher than the front seat 10A and on which a pillion passenger is seated.

On the rear side of the storage box 80, a passenger grip 48 is fixed to rear portions of the seat rails 14, 14.

As shown in FIG. 1, the body cover C includes a front cover 50 covering the front side and the left and right sides of the head pipe 12 and extending downwardly on the front side of the downward extensions 70; a front lower cover 51 (FIGS. 2 and 3) connected to a lower portion of the front cover 50 and located rearwardly of the front wheel 2 and an upper cover 52 joined to an upper portion of the front cover 50 on the lower side of the handle 25. An upper inner cover 53 is connected to left and right edge portions of the front cover 50 for covering the head pipe 12, the upper tubes 15, 15 and the downward extension parts 70 on the rear and lateral sides of them. A pair of left and right lower inner covers 54, 54 is joined to the lower edge of the upper inner cover 53 for covering the upper tubes 15, 15 and the downward extension parts 70. A pair of left and right step covers 55, 55 (FIGS. 2 and 3) is connected to a lower portion of the front cover 50 and lower edge portions of the lower inner covers 54, 54 for covering the step frames 23L and 23R on the upper side of them. A pair of left and right front floor skirts 56, 56 is joined to a lower portion of the front cover 50 and lower portions of the step covers 55, 55 for covering the step frames 23L and 23R on lateral sides. A pair of left and right rear floor skirts 57, 57 extend rearwardly in continuation with the front floor skirts 56, 56 for covering the down tubes 13, 13. An under cover 58 is provided for covering the left and right horizontal extension parts 71, 71 on the lower side. A pair of left and right body side covers 59, 59 is connected to rear portions of the lower inner covers 54, 54 and of the step covers 55, 55 for covering the storage box 80 and the seat rails 14, 14 on lateral sides under the seat 10. A tail cover 60 is joined to rear portions of the body side covers 59, 59.

At bottom portions of the left and right step covers 55, 55, the step floors 68 are respectively formed for positioning the feet of the driver seated on the front seat 10A.

The body cover C has a center tunnel part 69 bulging upwardly between the legs of the driver seated on the seat 10. The driver's feet are placed respectively on the step floors 68, 68 provided on the left and right sides of the center tunnel part 69.

The center tunnel part 69 is formed in a configuration wherein the upper tubes 15, 15 and front portions of the seat rails 14, 14 are covered with a lower portion of the upper inner cover 53, the lower inner covers 54, 54 and the step covers 55, 55 on the upper and lateral sides.

At a front portion of the front cover 50, a wind screen 61 is provided that extends rearwardly and upwardly. At the front end of the front cover 50, a head light 62 is provided. A pair of left and right turn signal lamps 63 is provided in continuation with an upper portion of the head light 62. A plate-shaped garnish 64 is provided between the head light 62 and the wind screen 61.

A front fender 65 covering the front wheel 2 on the upper side of the latter is provided on the front forks 26, 26. On the lower side of the body side covers 59, 59, a rear fender 66 is provided that covers the rear wheel 3 on the upper side of the latter.

A pair of tiltable-type tandem steps 67 (FIG. 1) for positioning the feet of the pillion passenger seated on the rear seat 10B are supported by tandem step stays 22, 22.

Figure 5:
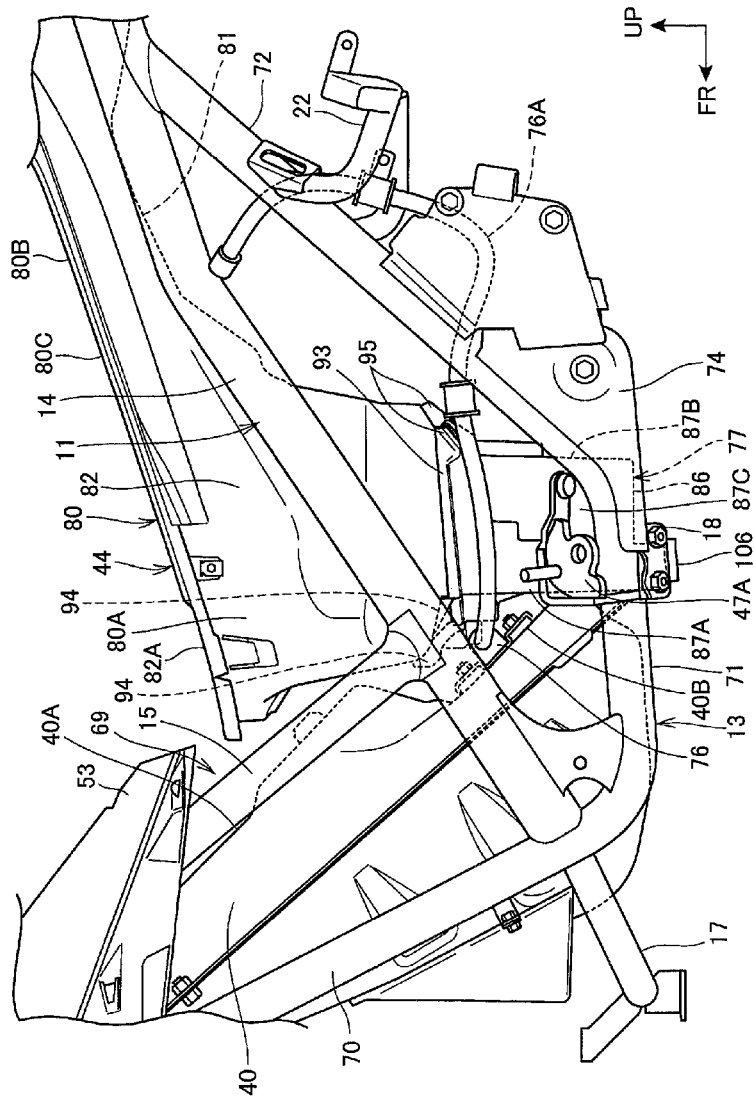
FIG. 5 is a left side view showing an inside structure of a central part of the vehicle.
Figure 6:
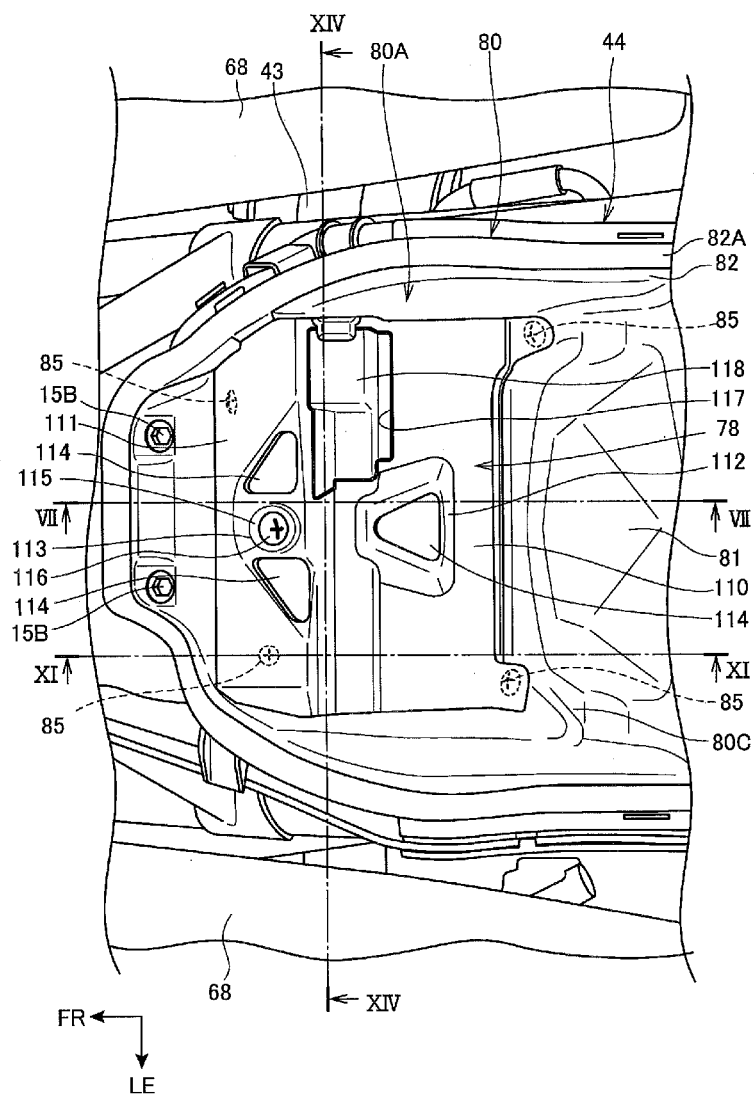
FIG. 6 is a plan view of a front storage part.
Figure 7:
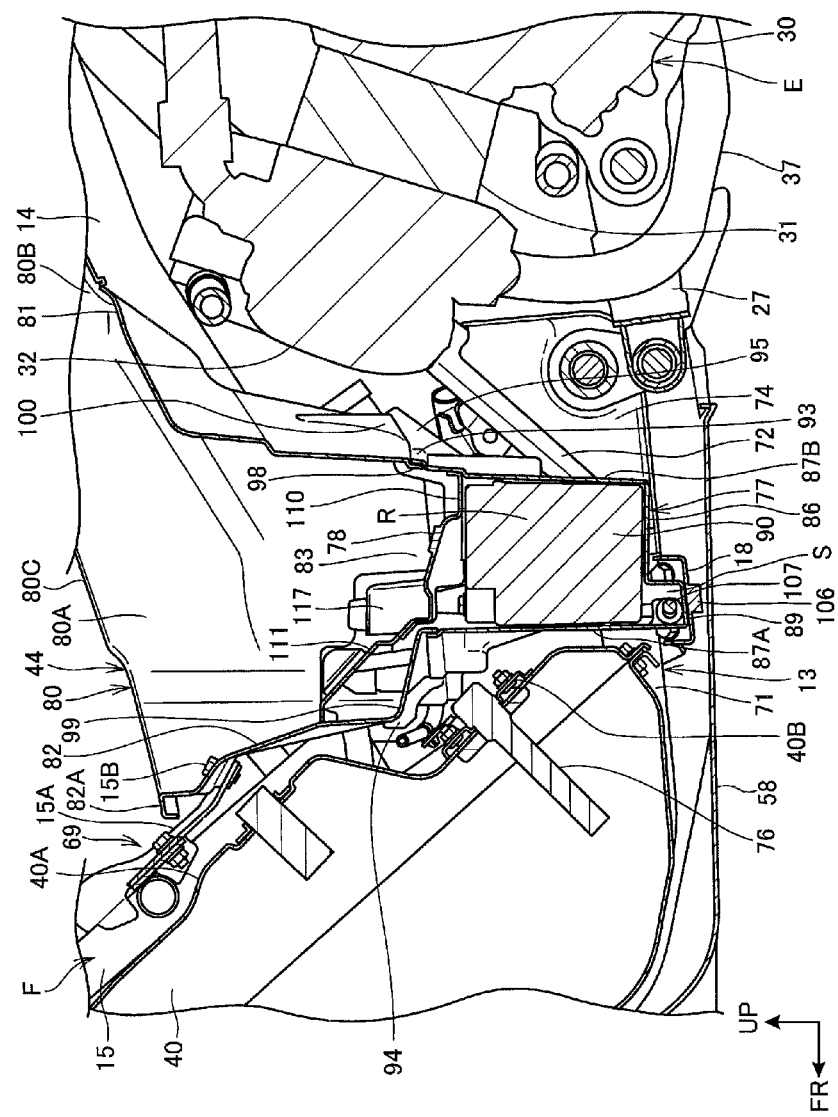
FIG. 7 is a sectional view taken along line VII-VII of FIG. 6.

FIG. 5 is a left side view showing an inside structure of a central part of the vehicle. FIG. 6 is a plan view of the front storage part 80A. FIG. 7 is a sectional view taken along line VII-VII of FIG. 6. In FIGS. 5 and 7, part of the body cover C, the seat 10 and the like are omitted.

As shown in FIGS. 5 to 7, the front storage part 80A of the storage box 80 is a large-sized storage part provided under the front seat 10A located in a vehicle longitudinally central area that includes such a volume wherein the rider's helmet (not shown) and the like can be stored therein.

A front portion of the storage box 80 is fixed to the upper tubes 15, 15 through stays 15A (FIG. 7) provided on the upper tubes 15, 15. The front portion of the storage box 80 is fastened to the stays 15A by box-fixing bolts 15B, 15B inserted and passed from the inside of the front storage part 80A.

In addition, the storage box 80 is fastened to the body frame F also by, for example, fixing parts (not shown) provided on the seat rails 14, 14.

A battery box 77 in which to accommodate a battery 90 of the vehicle is connected to a lower portion of the front storage part 80A. A lid part 78 for closing an upper surface of the battery box 77 so as to partition the front storage part 80A and the battery box 77 is provided at a bottom portion of the front storage part 80A.

The fuel tank 40 is disposed inside the center tunnel part 69, and is fixed to the main frame 11. A rear wall 40A of the fuel tank 40 is inclined forwardly and upwardly, and is located forwardly of the front storage part 80A and the battery box 77. At a lower portion of the rear wall 40A, a fuel pump fixing part 40B is provided forwardly of the battery box 77. A cylindrical fuel pump 76 is inserted in the fuel pump fixing part 40B, and its upper portion is fixed to the fuel pump fixing part 40B, while its lower portion is located in a bottom portion of the fuel tank 40.

A fuel supply tube 76A (FIG. 5) connected to an upper portion of the fuel pump 76 is sequentially passed on the left side of the battery box 77 and on the inner side of the oblique upwardly extension part 72, to be connected to the engine E side.

Figure 8:
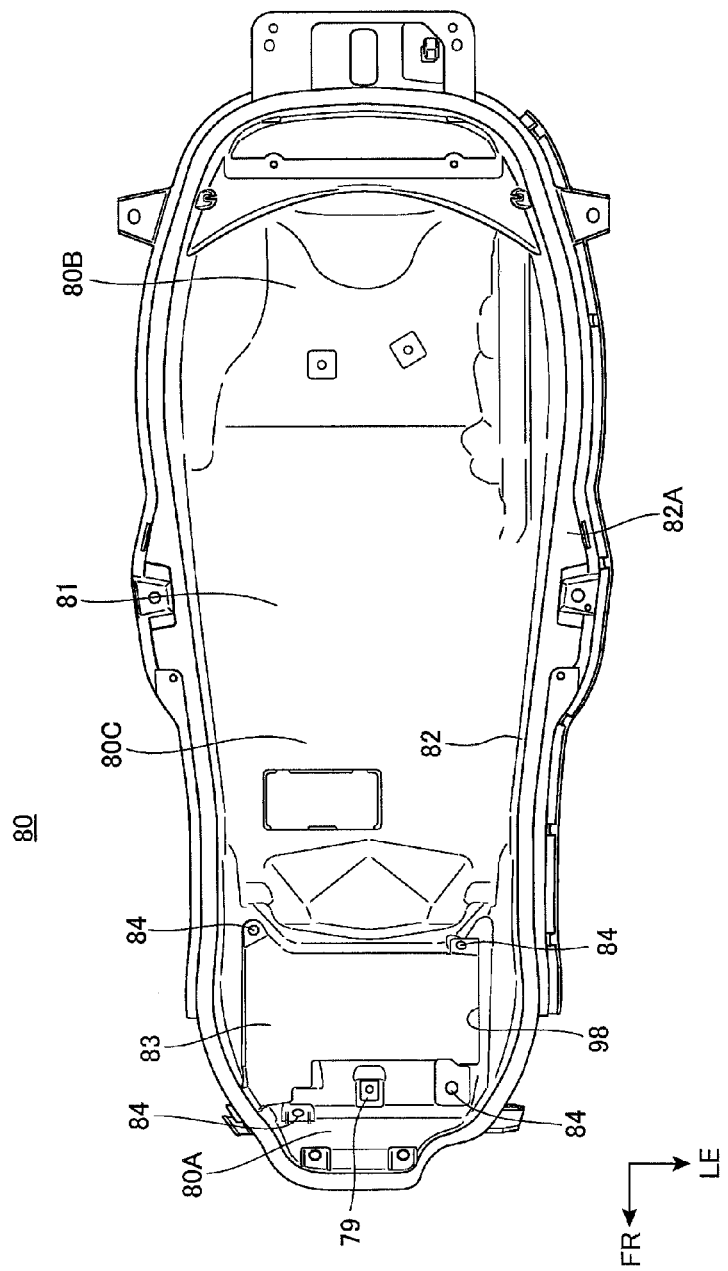
FIG. 8 is a plan view of a storage box.

FIG. 8 is a plan view of the storage box 80.

As shown in FIGS. 5 to 8, the storage box 80 is formed in the form of a box that has a bottom plate 81 extending in the front-rear direction, and a side wall part 82 provided upright along the whole of a peripheral edge portion of the bottom plate 81 that is open substantially entirely on the upper side. A seat receiving part 82A for receiving a peripheral edge portion of a bottom plate of the seat 10 is formed at an upper edge portion of the side wall part 82. The front storage part 80A has its front wall and left and right side walls composed of the side wall part 82, and has its rear wall composed of a part of the bottom plate 81, that is curved upwardly.

The front storage part 80A is provided at its bottom portion with a substantially rectangular opening 83 that opens to the lower side. The front storage part 80A communicates with the battery box 77 through the opening 83.

Fixing holes 84 . . . ( . . . denotes plurality, here and hereafter) are provided respectively near the four corners of the peripheral edge portion of the opening 83. Fixing bolts 85 . . . (FIG. 6) as fastening members for connecting the battery box 77 to the front storage part 80A are inserted and passed through the fixing holes 84 . . . .

At a bottom portion of the front storage part 80A, a fixing part 79 for fixing the lid part 78 is formed between the fixing holes 84, 84 on the front side.

Figure 9:
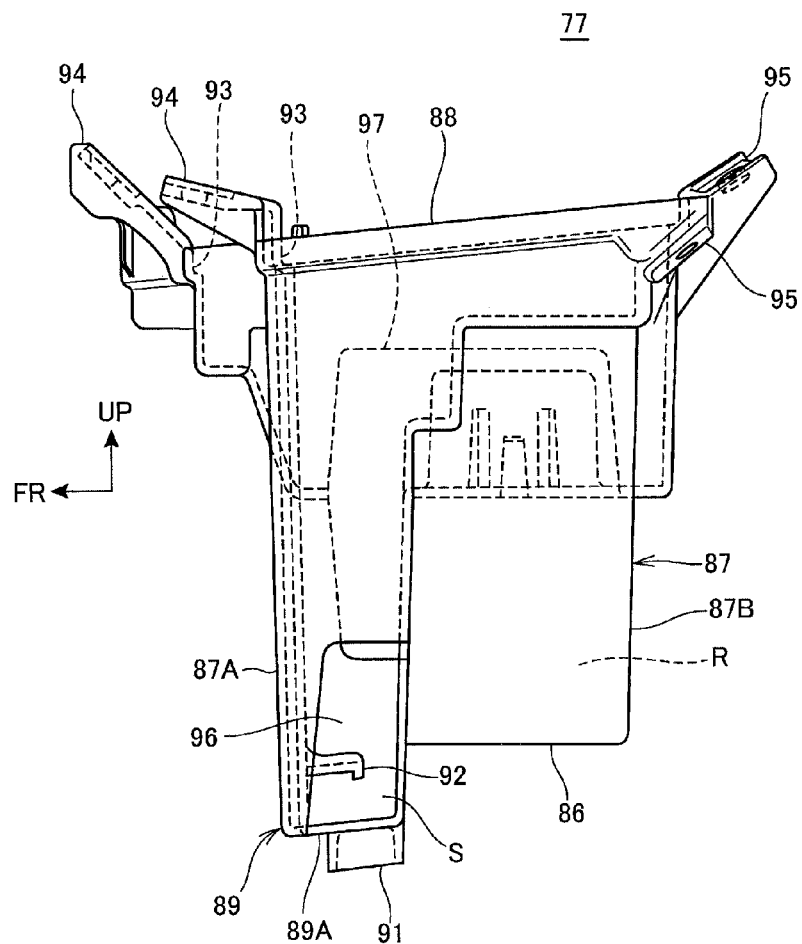
FIG. 9 is a left side view of a battery box.
Figure 10:
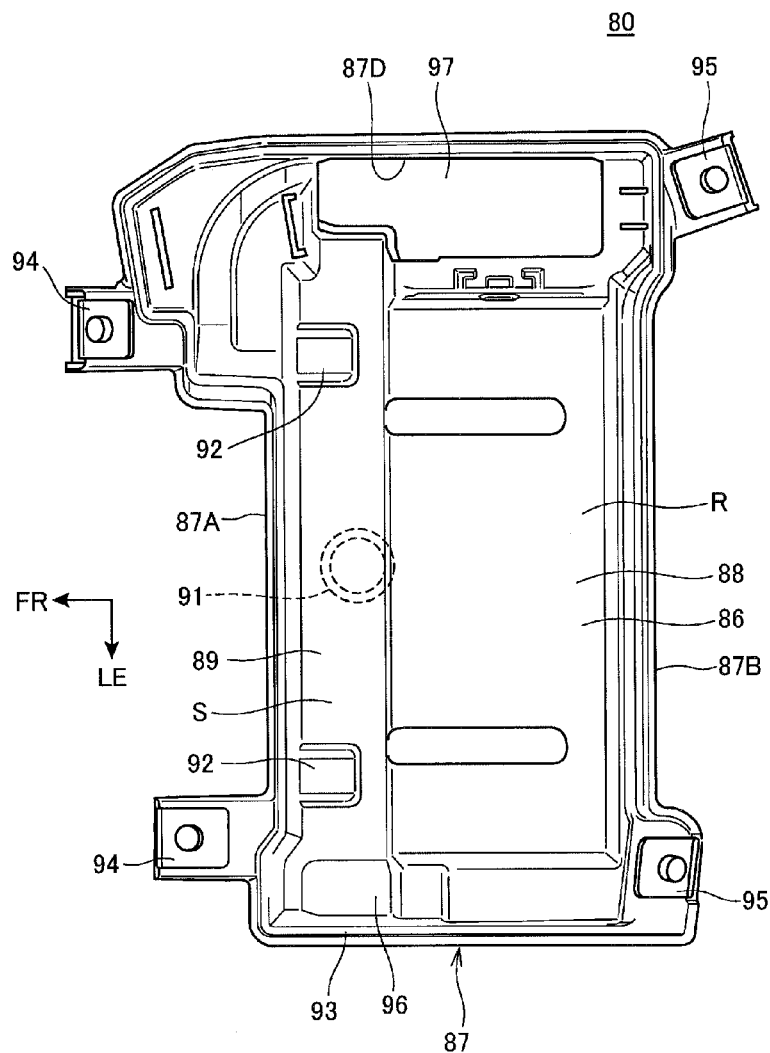
FIG. 10 is a plan view of the battery box.

FIG. 9 is a left side view of the battery box 77. FIG. 10 is a plan view of the battery box 77.

As shown in FIGS. 7, 9 and 10, the battery box 77 is formed in the shape of a box, that has a bottom wall 86 (battery box bottom wall) for supporting the box-formed battery 90, and a side wall part 87 rising upright from the whole of the peripheral edge portion of the bottom wall 86 in such a manner as to define a battery storage part R. The battery box 77 is provided on the upper side thereof with an opening 88 that opens over substantially the whole area on the upper side.

The battery box 77 is formed, at a front part of a bottom portion thereof, with a bulging part 89 that bulges to below the bottom wall 86 of the battery storage part R. The bulging part 89 is formed over the whole range in the vehicle width direction of the bottom wall 86. A bottom surface 89A of the bulging part 89 is mounted on the horizontal part cross member 18. A cylindrical positioning projecting part 91 (positioning part) projecting downwardly is formed at a vehicle-width-directionally central part of the bottom surface 89A.

A space S wherein wiring and the like can be laid is formed inside the bulging part 89. In an upper portion of the space S, a pair of claw parts 92, 92 are provided that project rearwardly from a front wall 87A of the side wall part 87.

The side wall part 87 is provided at its upper portion with a fitting stepped part 93, that is formed by a method wherein an upper portion of the side wall part 87 is one step widened. The fitting stepped part 93 is formed along the whole of an inner peripheral part of the upper portion of the side wall part 87, and is fitted to a lower edge portion of the front storage part 80A from the outside.

At an upper portion of the front wall 87A of the side wall part 87, front-side fixing plate parts 94, 94 (guide parts) obliquely extending forwardly and upwardly in continuation with the upper edge of the fitting stepped part 93 are formed at both end portions with respect to the vehicle width direction. The front-side fixing plate parts 94, 94 are slanted down toward a front-rear-directionally central portion of the battery box 77. In the side view in FIG. 9, upper surfaces of the front-side fixing plate parts 94, 94 are inclined forwardly and upwardly, but they are not inclined in the vehicle with direction, and they extend straight in the front-rear direction.

At an upper portion of the rear wall 87B of the side wall part 87, rear-side fixing plate parts 95, 95 (guide parts) obliquely extending rearwardly and upwardly in continuation with the upper edge of the fitting stepped part 93 are formed at both end portions with respect to the vehicle width direction. The rear-side fixing plate parts 95, 95 are slanted down toward a central portion of the battery box 77. In the side view in FIG. 9, upper surfaces of the rear-side fixing plate parts 95, 95 are inclined rearwardly and upwardly, and they are inclined in the vehicle width direction so as to face inwardly in the vehicle width direction.

A left wall 87C of the side wall part 87 is formed at its lower portion with an opening 96 through that the space S and the battery storage part R communicate with the outside. In addition, a right wall 87D of the side wall part 87 is formed with an opening 97 through which the battery storage part R communicates with the outside.

Figure 11:
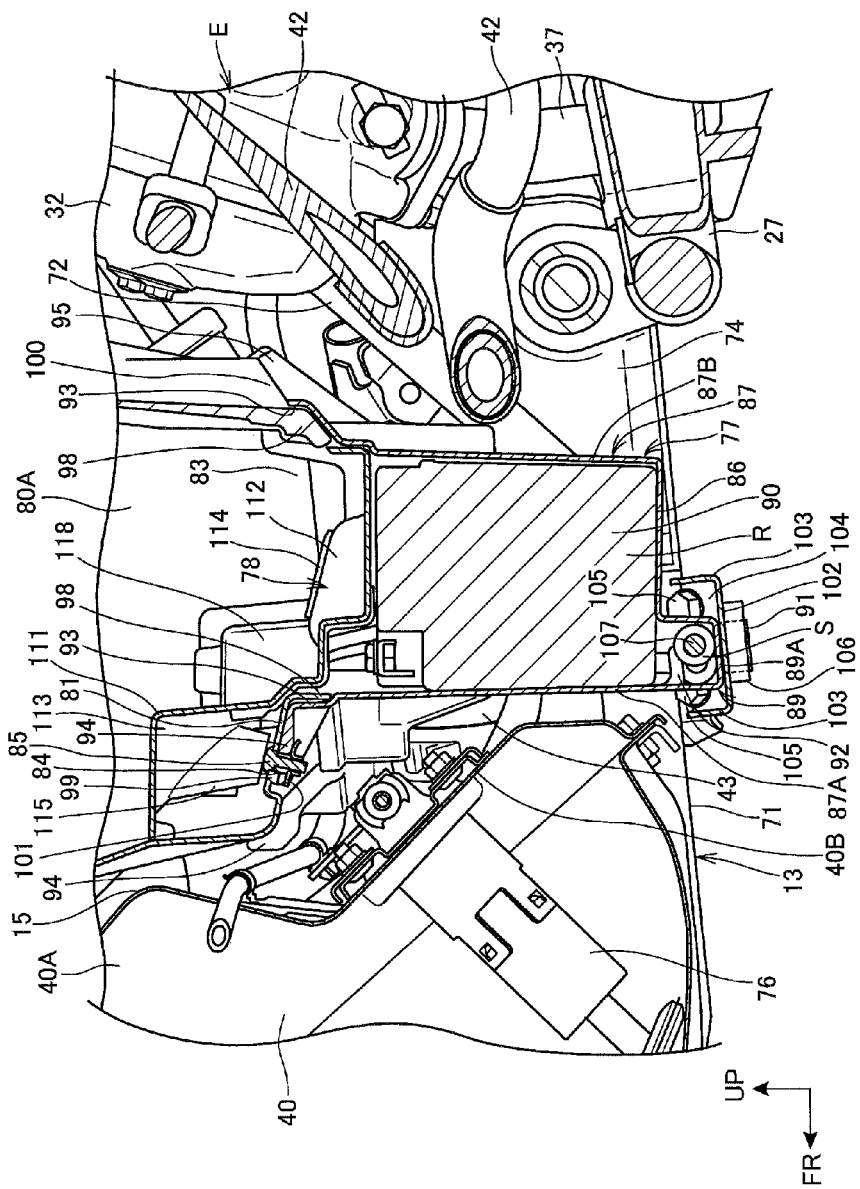
FIG. 11 is a sectional view taken along line XI-XI of FIG. 6.

FIG. 11 is a sectional view taken along line XI-XI of FIG. 6.

As shown in FIGS. 7 and 11, the lower edge of the front storage part 80A defining the opening 83 of the front storage part 80A projects downwardly in a frame-like shape to form a lower fitting part 98. The fitting stepped part 93 at the upper portion of the battery box 77 is fitted to an outside surface of the lower fitting part 98 from outside.

Figure 12:
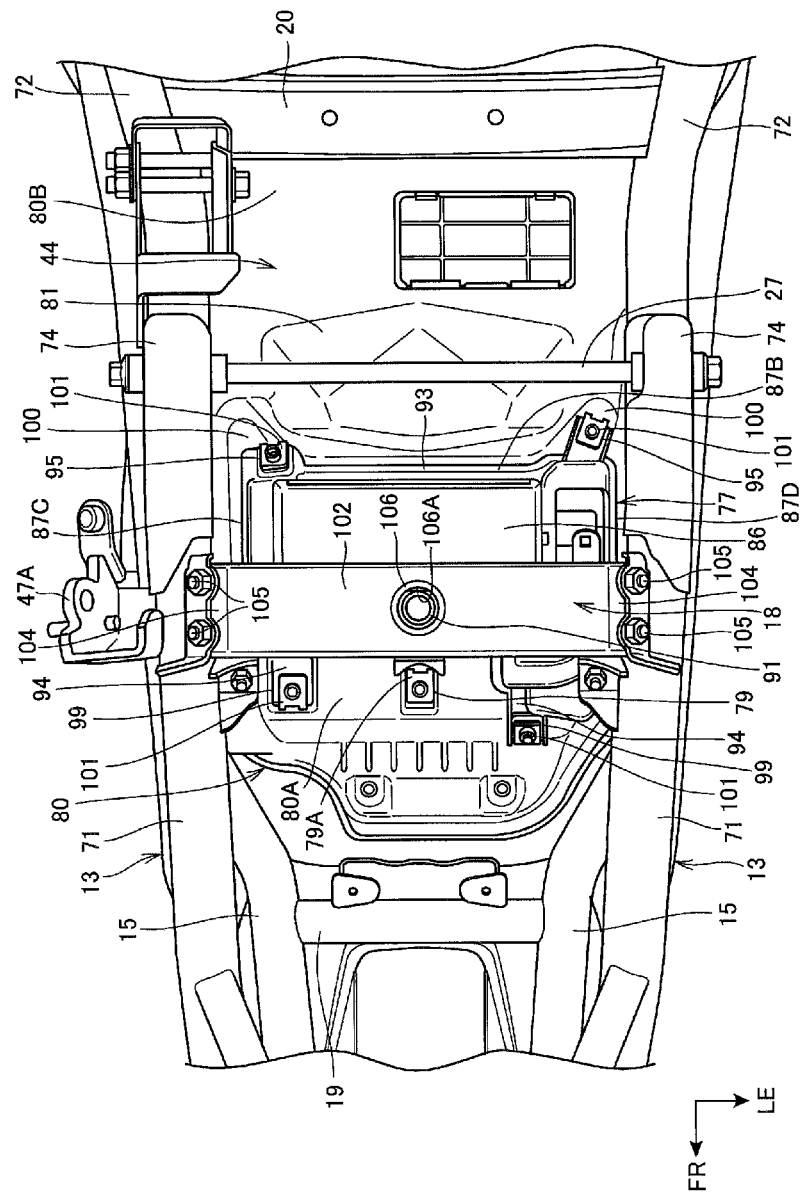
FIG. 12 is a view from below of the battery box and the storage box.
Figure 13:
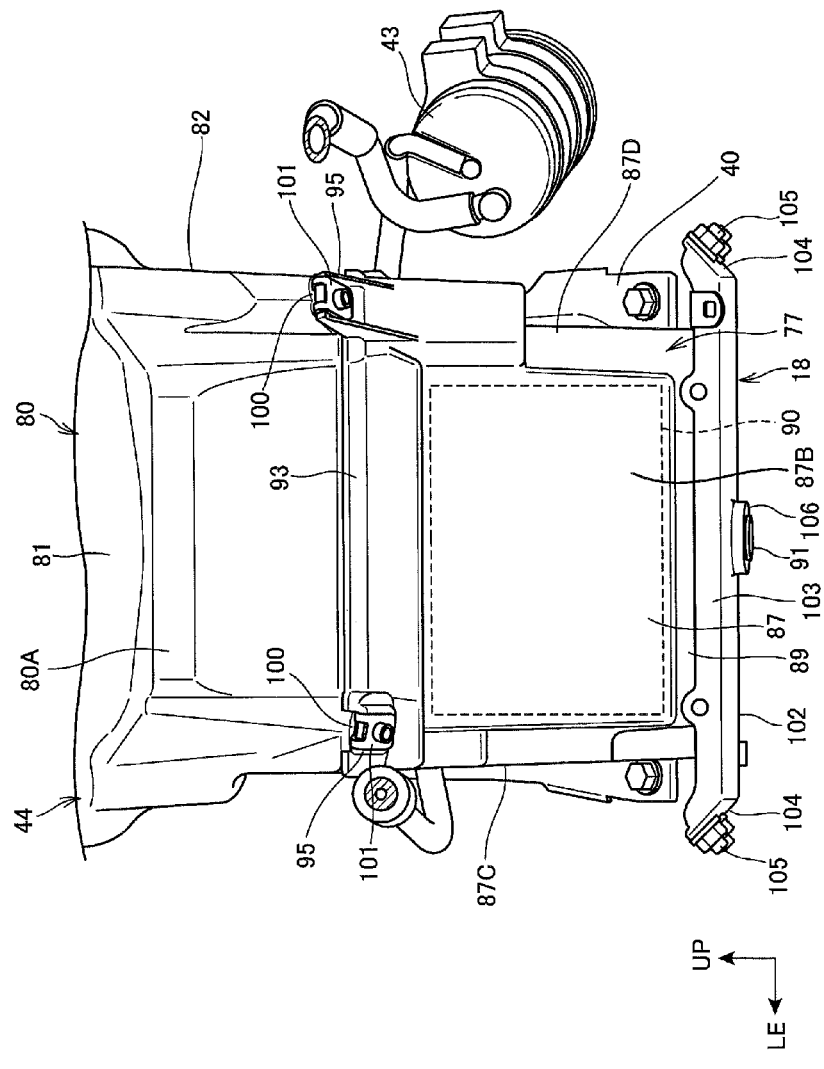
FIG. 13 is a view from the rear side of the battery box.

FIG. 12 is a view from below of the battery box 77 and the storage box 80. FIG. 13 is a view from the rear side of the battery box 77. In FIGS. 12 and 13, the body cover C is omitted. In addition, in FIG. 13, the body frame F exclusive of the horizontal part cross member 18 is omitted.

As shown in FIGS. 7 and 11 to 13, the bottom plate 81 of the front storage part 80A is formed, on the upper side of the lower fitting part 98, with a front-side slant surface 99 inclined forwardly and upwardly in conformity with the front-side fixing plate parts 94, 94 of the battery box 77, and with a rear-side slant surface 100 inclined rearwardly and upwardly in conformity with the rear-side fixing plate parts 95, 95 of the battery box 77. When the fitting stepped part 93 of the battery box 77 is fitted to the lower fitting part 98 of the storage box 80, the front-side fixing plate parts 94, 94 make contact with the front-side slant surface 99, whereas the rear-side fixing plate parts 95, 95 make contact with the rear-side slant surface 100 from below.

The fixing holes 84, 84 (FIG. 11) in a front portion of the front storage part 80A are formed in the front-side slant surface 99 at positions corresponding to the front-side fixing plate parts 94, 94. In addition, the fixing holes 84, 84 in a rear portion of the front storage part 80A are formed in the rear-side slant surface 100 at positions corresponding to the rear-side fixing plate parts 95, 95. Clip nuts 101 are provided respectively at tip portions of the front-side fixing plate parts 94, 94 and the rear-side fixing plate parts 95, 95. The fixing bolts 85 are inserted and passed through the fixing holes 84 ... from the inside of the front storage part 80A, and are fastened to the clip nuts 101 ... of the battery box 77. By this structure, the battery box 77 is fixed to the storage box 80.

Figure 14:
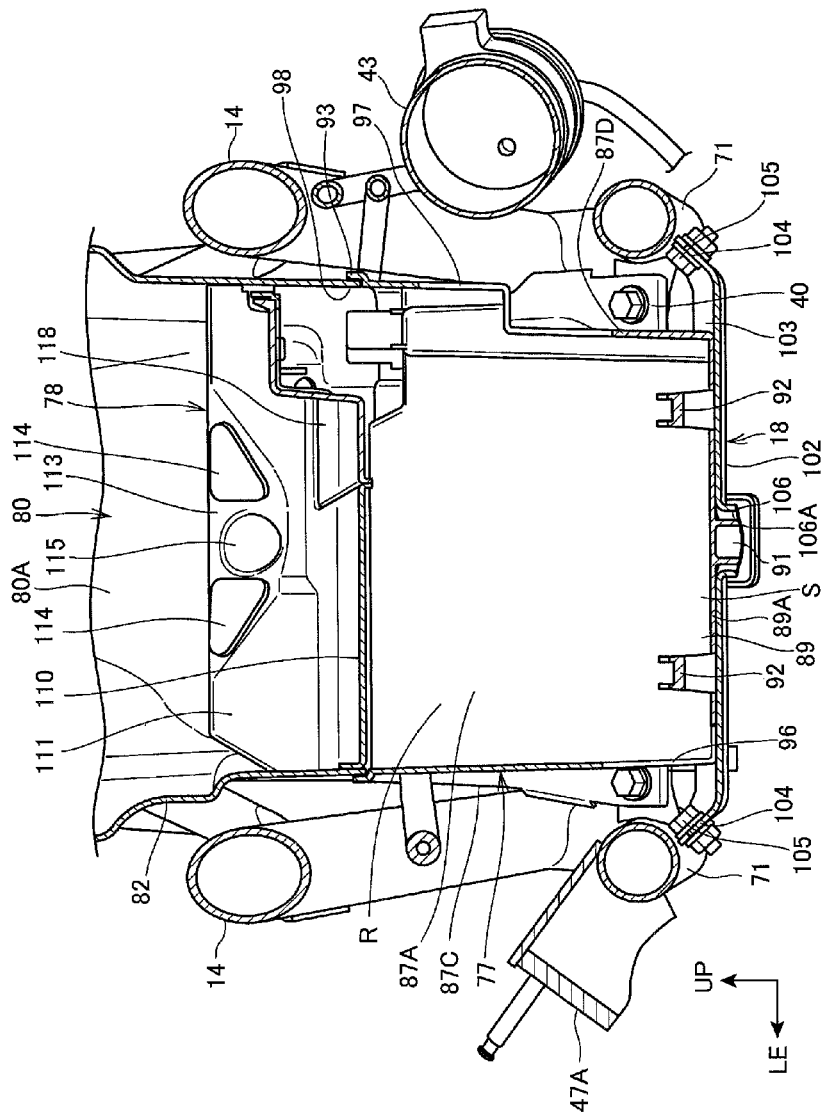
FIG. 14 is a sectional view taken along line XIV-XIV of FIG. 6.

FIG. 14 is a sectional view taken along line XIV-XIV of FIG. 6.

As shown in FIGS. 11 to 14, the horizontal part cross member 18 includes a plate part 102 that is a plate member formed in a roughly angular U-shaped sectional form opening to the upper side and that interconnects the left and right horizontal extension parts 71, 71 and reinforcement ribs 103, 103 erected in the manner of bending upwardly the front edge and the rear edge of the plate part 102. The horizontal part cross member 18 is provided with connection parts 104 at both ends with respect to the vehicle width direction and is fastened to lower surfaces of the horizontal extension parts 71, 71 by a plurality of fixing bolts 105 inserted and passed through the connection parts 104.

The horizontal part cross member 18 is formed, at a vehicle-width-directionally central portion thereof, with a positioning recessed part 106 in the form of a cylinder projecting downwardly from the plate part 102. The positioning recessed part 106 is formed in its center with a positioning hole 106A penetrating it in the vertical direction. The battery box 77 is positioned relative to the horizontal part cross member 18 by a process wherein the positioning projecting part 91 at the bottom surface 89A of the battery box 77 is fitted into the positioning hole 106A.

The bulging part 89 of the battery box 77 is formed so that the downwardly bulging height thereof is greater than the height of the reinforcement ribs 103, 103. In addition, the width of the bulging part 89 in the front-rear direction is smaller than the width between the reinforcement ribs 103, 103. The bulging part 89 is in contact with the upper surface of the plate part 102 of the horizontal part cross member 18. More specifically, of the battery box 77, the bottom wall 86 is not in contact with the horizontal part cross member 18, and only the bulging part 89 is mounted on the horizontal part cross member 18, whereby the battery box 77 is supported from below by the horizontal part cross member 18. In addition, the battery box 77 is positioned relative to the horizontal part cross member 18 by the positioning projecting part 91.

In the space S of the bulging part 89, wiring 107 connected to the battery 90 is laid so as to traverse the space S in the vehicle width direction. The wiring 107 is pressed from above by the claw parts 92, 92.

Since the battery box 77 is thus provided with the bulging part 89, it is ensured that despite the configuration in which the horizontal part cross member 18 that is a roughly angular U-shaped in section is used, the battery box 77 can be mounted on the horizontal part cross member 18 with a simple structure. This makes it unnecessary to reduce the battery storage part R for the purpose of mounting the horizontal part cross member 18. Furthermore, since the wiring 107 is laid in the space S so as to traverse the space S in the vehicle width direction, the wiring 107 can be disposed while effectively utilizing a dead space in the bulging part 89, whereby the vehicle can be made compact.

As shown in FIGS. 6, 11 and 14, the lid part 78 includes a lid plate part 110 that is provided so as to close the opening 83 of the front storage part 80A for covering the battery 90 on the upper side of the latter, and an upwardly bulging part 111 that bulges upwardly from a front portion of the lid plate part 110.

The lid part 78 also supports, from below, a helmet (not shown) stored in the front storage part 80A. The helmet is stored in the front storage part 80A in such a posture that a top portion of the helmet is located on the lower side. The lid plate part 110 is provided with a top portion support part 112 that is bulging upwardly so as to support the top portion. In addition, the upwardly bulging part 111 is formed, in a central part of an upper portion thereof, with a side portion support part 113 that is recessed in an arcuate shape in conformity with the shape of the helmet for the purpose of supporting a side portion, near the top portion, of the helmet. The top portion support part 112 and the side portion support part 113 are provided respectively with cushion pads 114 for making elastic contact with the helmet.

The top portion support part 112 is formed, in a vehicle-width-directionally central portion thereof, with a lid fixing hole part 115 that bulges downwardly in a cylindrical shape and extends until it comes into contact with the fixing part 79 of the bottom portion of the front storage part 80A. A clip nut 79A (FIG. 12) is provided at the fixing part 79. The lid part 78 is fixed to the front storage part 80A by a structure wherein its peripheral edge portion is fitted into the inner wall surface of the front storage part 80A, and wherein a lid fixing bolt 116 provided at a bottom portion of the lid fixing hole part 115 is fastened to the clip nut 79A at the fixing part 79.

In addition, the lid part 78 is formed at its right side portion with an opening 117 permitting an upper portion of the battery 90 to be partly exposed. The opening 117 extends in the vertical direction while being formed to range in both the lid plate part 110 and the upwardly bulging part 111. The opening 117 is closed by fitting a detachable sub-lid 118 thereinto.

All the fixing bolts 85 . . . are covered with the lid part 78 and thereby are hidden.

Figure 15:
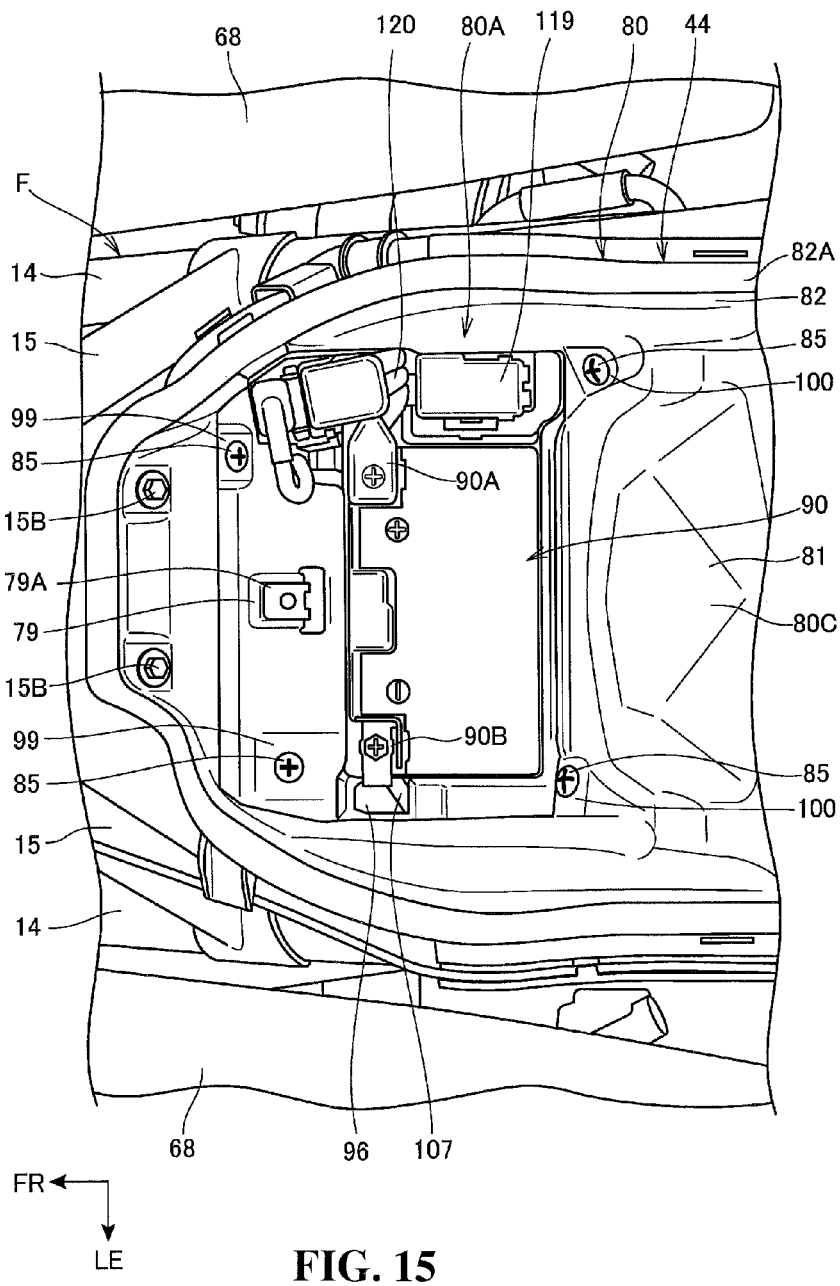
FIG. 15 is a plan view of the front storage part, with a lid part detached.

FIG. 15 is a plan view of the front storage part 80A in the condition where the lid part 78 is detached.

As shown in FIG. 15, when the lid part 78 is detached, an upper portion of the battery 90 and the fixing bolts 85 . . . are exposed in the front storage part 80A. The battery 90 is roughly rectangular in top a view. A plus terminal 90A and a minus terminal 90B are provided at the right end and the left end of a front part of an upper portion of the battery 90. A fuse box 119 and wiring 120 that are connected to the battery 90 are disposed on the right side of the plus terminal 90A. The fuse box 119 and the wiring 120 are normally covered with the lid part 78, and are exposed in the front storage part 80A when the lid part 78 is detached.

Figure 16:
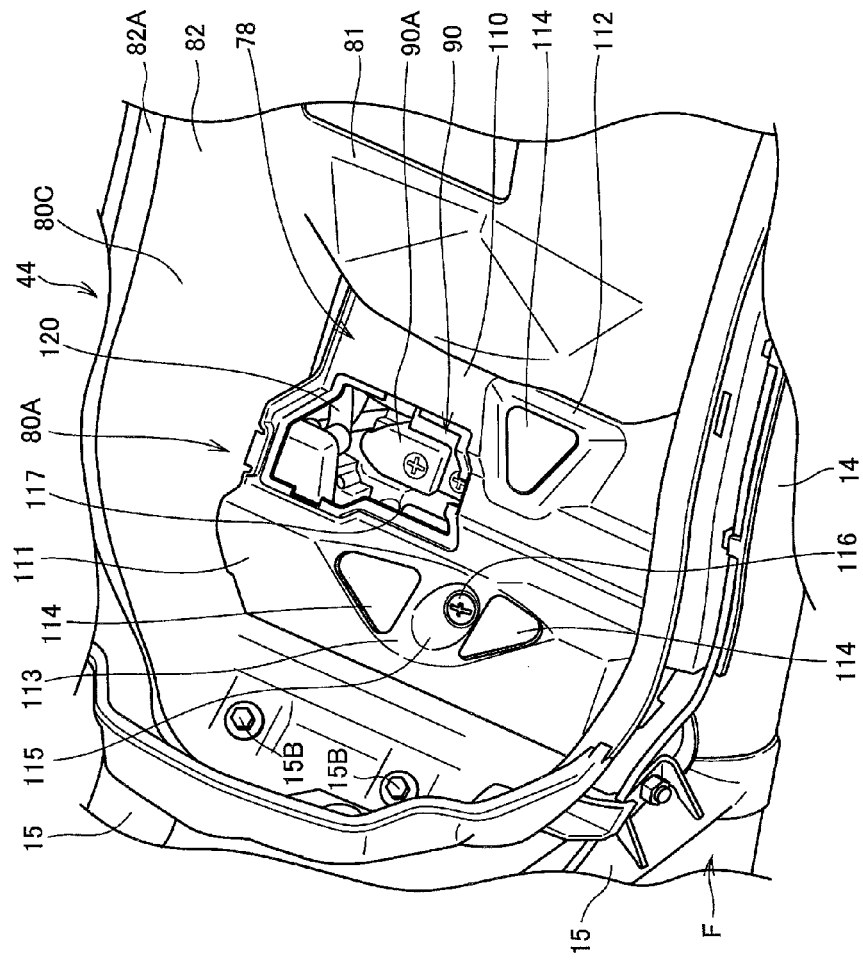
FIG. 16 is a perspective view of the front storage part, with a sub-lid detached.

FIG. 16 is a perspective view of the front storage part 80A in the condition where the sub-lid 118 is detached.

The opening 117 and the sub-lid 118 are provided at such a position as to overlap with the plus terminal 90A. When the sub-lid 118 is detached, the plus terminal 90A is exposed in the front storage part 80A, resulting in a test cable or the like can be connected to the plus terminal 90A. A minus terminal of the test cable is connected to the body frame F.

With the sub-lid 118 provided in this manner, it is ensured that an access to the plus terminal 90A is secured even without an operation of unfastening the lid fixing bolt 116 and detaching the lid part 78. Thus, good working on the terminal is secured.

Figure 17:
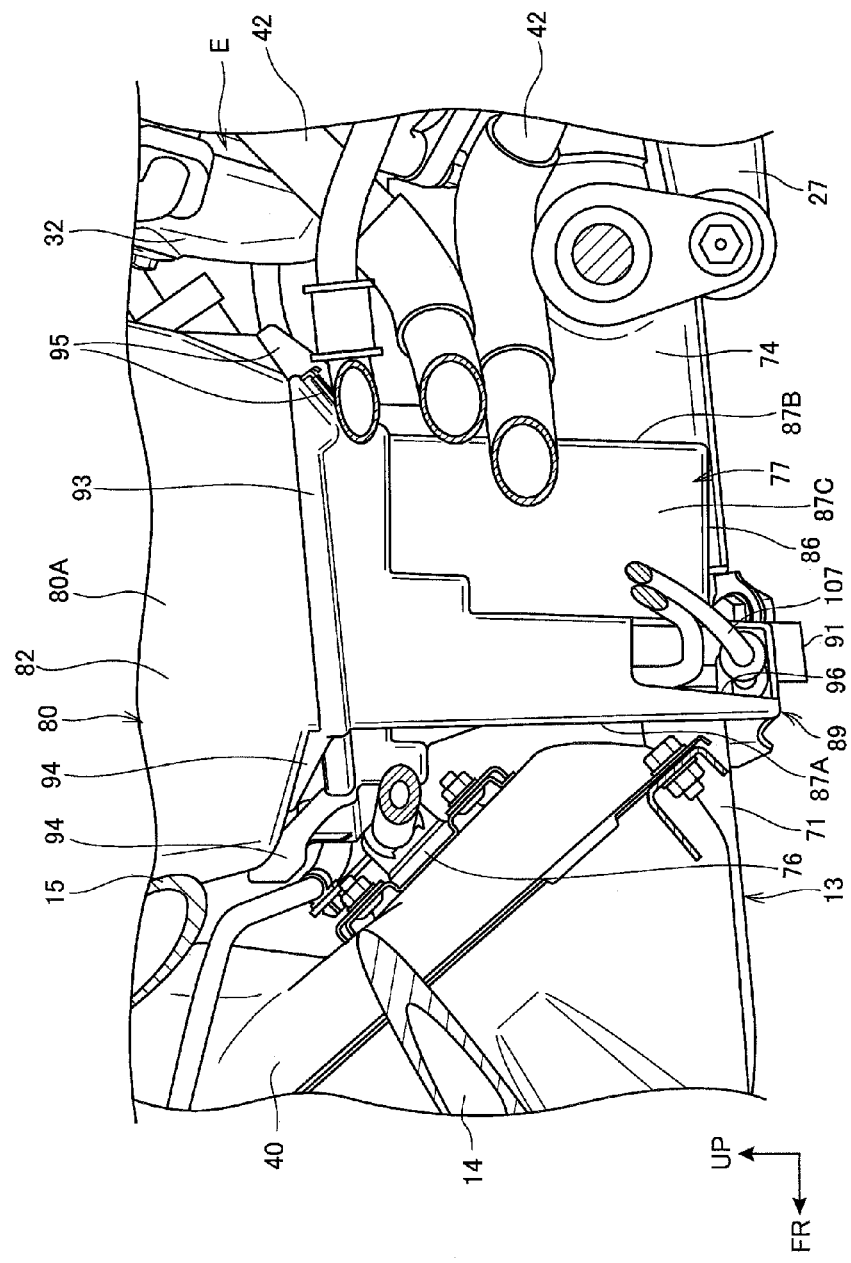
FIG. 17 is a sectional view showing a left side surface part of the battery box.

FIG. 17 is a sectional view showing a left side surface part of the battery box 77.

As shown in FIG. 17, the wiring 107 connected to the battery 90 is led out to the outside through the opening 96 in the left side 87C of the battery box 77. In addition, other wiring (not shown) connected to the battery 90 is led out to the outside through an opening 97 (FIG. 9) in the right wall 87D of the battery box 77. In other words, in the present embodiment, the wiring 107 and the like connected to the battery 90 are not laid inside the storage box 80 but laid inside the battery box 77.

In addition, cooling water pipes 42, 42 are connected to the engine E while passing on the rear side of the battery box 77.

A method for attaching the storage box 80 and the battery box 77 will be described with reference to FIG. 7. At the time of manufacturing the motorcycle 1, the storage box 80 and the battery box 77 are prepared as a sub-assembly by being preliminarily integrally mounted by the fixing bolts 85 . . . , to be supplied to the production line. Then, the sub-assembly is disposed between the seat rails 14, 14, and fastened and fixed to the body frame F by box fixing bolts 15B, 15B (FIG. 7). In this instance, the positioning projecting part 91 of the bulging part 89 of the battery box 77 is fitted into the positioning recessed part 106 of the horizontal part cross member 18, whereby the position of the battery box 77 is guided. Therefore, despite the use of the configuration wherein the horizontal part cross member 18 is in the roughly angular U-shaped sectional form opening to the upper side, the bulging part 89 can be easily mounted on the plate part 102 of the horizontal part cross member 18 without being obstructed by the reinforcement ribs 103, 103. Consequently, the storage box 80 and the battery box 77 can be easily mounted.

An attaching/detaching method for removing the storage box 80 at the time of maintenance or the like is hereinafter described.

In the case of checking the components on the engine E side such as the throttle body 36 and an injector and the like in the motorcycle 1, it is necessary to detach the storage box 80 located on the upper side of the engine E, and, simultaneously, it is required to supply electric power from the battery 90 to the engine E side. Further, if the battery 90 and the engine E side are disconnected from each other at the time of detaching the storage box 80, information recorded in a control unit on the engine E side or the like may be influenced. Therefore, it is desirable that the storage box 80 can be independently detached, without disconnecting the battery 90 and the engine E side from each other.

At the time of detaching the storage box 80, first, the operator detaches the lid part 78 by unfastening the lid fixing bolt 116 (FIG. 6) and detaching the lid part 78, to thereby expose the fixing bolts 85 . . . (FIG. 15) in the front storage part 80A. In addition, the fastening parts between the body frame F and the storage box 80, such as the box fixing bolts 15B, 15B, are unfastened. Next, the fixing bolts 85 . . . are unfastened from the side of the opening 80C of the front storage part 80A, and the storage box 80 is pulled upwardly, whereby the fitting between the lower fitting part 98 (FIG. 7) and the fitting stepped part 93 is released, and the storage box 80 is solely detached from the motorcycle 1. In this condition, the battery box 77 disconnected from the storage box 80 is left on the body frame F side, with the battery 90 stored therein, and is supported in the state of being mounted on the horizontal part cross member 18. Thus, the battery box 77 is mounted on and supported by the horizontal part cross member 18. Therefore, even in the condition where the storage box 80 has been detached, the battery box 77 can be supported assuredly, and there is no need to cancel the connection between the battery 90 and the engine E side. Consequently, good maintenance is secured.

In addition, as shown in FIG. 17, the fuel tank 40 is disposed forwardly of the battery box 77, adjacently to the front wall 87A of the battery box 77. In addition, the cooling water pipes 42, 42 for the engine E are located rearwardly of the battery box 77, adjacently to the rear wall 87B of the battery box 77. Therefore, the battery box 77 can be received by the fuel tank 40 and the cooling water pipes 42, 42. Accordingly, the battery box 77 can be prevented from tilting to the front or rear side.

Furthermore, the cylindrical positioning projecting part 91 of the battery box 77 is fitted into the cylindrical positioning recessed part 106 of the horizontal part cross member 18. This ensures that the positioning projecting part 91 is restrained from moving and also contributes to the prevention of the battery box 77 from tilting to the front or rear side.

In addition, the wiring 107 and the like connected to the battery 90 are not laid in the storage box 80 but laid in the battery box 77. This ensures that the storage box 80 can be solely detached, with the battery box 77 left on the horizontal part cross member 18, without being obstructed by the wiring 107 or the like.

In the case of attaching the storage box 80 after the maintenance on the engine E side is over, the operator passes the storage box 80 between the seat rails 14, 14 from above, moves the front storage part 80A downwardly, and fits the lower fitting part 98 to the fitting stepped part 93 at an upper portion of the battery box 77 that is mounted on the horizontal part cross member 18. In this embodiment, the front-side fixing plate parts 94, 94 and the rear-side fixing plate parts 95, 95 are slanted down toward the side of the center of the battery box 77 in conformity with the front-side slant surface 99 and the rear-side slant surface 100 at the lower portion of the front storage part 80A. The position of the front storage part 80A in the front-rear direction is guided by the front-side fixing plate part 94, 94 and the rear-side fixing plate parts 95, 95. Therefore, the lower fitting part 98 can be easily fitted to the fitting stepped part 93 by only moving the front storage part 80A downwardly.

Furthermore, as shown in FIG. 9, the rear-side fixing plate parts 95, 95 are not only slanted down toward the center of the battery box 77 but also slanted in the vehicle width direction so as to face the inner side in the vehicle width direction. This ensures that the position of the front storage part 80A can be guided in the vehicle width direction, as well. Consequently, the lower fitting part 98 can be easily fitted to the fitting stepped part 93 by only moving the front storage part 80A downwardly.

Subsequently, the operator fits the lower fitting part 98 to the fitting stepped part 93, and inserts the fixing bolts 85 . . . through the fixing holes 84 . . . from the inside of the front storage part 80A, and fastens them to the clip nuts 101 . . . , whereby the storage box 80 and the battery box 77 can be fixed integrally. Thereafter, the fastening parts such as the box fixing bolts 15B, 15B are fastened, whereby the storage box 80 is fixed to the body frame F. The lid part 78 is fixed by the lid fixing bolt 116.

As has been described above, according to this embodiment of the present invention, the battery box 77 is formed as a body separate from the storage box 80 and fixed to the storage box 80. The battery box 77 is disposed under the storage box 80, the horizontal part cross member 18 constituting the body frame F is provided under the battery box 77, and the battery box 77 is mounted on the horizontal part cross member 18. This ensures that even in the condition where the battery box 77 is detached from the storage box 80, the battery box 77 is mounted on and supported by the horizontal part cross member 18. Therefore, the battery box 77 can be easily separated from the storage box 80 to perform disassembly, and, at the time of maintenance or inspection, the storage box 80 can solely be detached, without detaching the battery 90 and with the battery box 77 left on the horizontal part cross member 18. Consequently, maintenance can be enhanced.

In addition, the storage box 80 and the battery box 77 are fixed by the fixing bolts 85 . . . , and the fixation with the fixing bolts 85 . . . can be performed from the side of the opening 80C at the upper side of the storage box 80. This ensures that the fixation with the fixing bolts 85 . . . can be released by operating from the side of the opening 80C of the storage box 80. Thus, the work to detach the battery box 77 can be enhanced.

In addition, the battery box 77 has the positioning projecting part 91 for positioning of the battery box 77 and the horizontal part cross member 18. The battery box 77 is mounted in the state of being positioned relative to the positioning recessed part 106 of the horizontal part cross member 18 by the positioning the projecting part 91. Therefore, there is no need to provide a fastening part for fixing the battery box 77 to the horizontal part cross member 18. Accordingly, the assembly can be enhanced.

Furthermore, the battery box 77 is provided with the front-side fixing plate parts 94, 94 and the rear-side fixing plate parts 95, 95 that are formed to be fitted to the lower fitting part 98 of the storage box 80 from outside the storage box 80 and that are slanted down toward the center of the battery box 77. The battery box 77 can be fitted to the storage boxy 80 while easily positioning it by the front-side fixing plate parts 94, 94 and the rear-side fixing plate parts 95, 95. This promises high efficiency in fixing the battery box 77 to the storage box 80.

In addition, the contact part of the battery box 77 for contact with the horizontal part cross member 18 is formed as the bulging part 89 bulging downwardly from the bottom wall 86 of the battery box 77 that is contacted by the battery 90. Therefore, by making the shape of the bulging part 89 correspond to the roughly angular U-shaped form of the horizontal part cross member 18, it is possible to easily mount the battery box 77 on the horizontal part cross member 18. Thus, it is unnecessary to reduce the storage space for the battery 90 for the purpose of putting the battery box 77 in contact with the horizontal part cross member 18. The battery box 77 can be mounted on the horizontal part cross member 18 with a simple structure, and the storage space for the battery 90 can be secured to be large. Further, the wiring 107 is passed inside the bulging part 89 in the manner of traversing it in the vehicle width direction. Therefore, the wiring 107 can be laid while effectively utilizing the dead space in the bulging part 89, so that the vehicle can be made compact.

The fuel tank 40 is disposed forwardly of the battery box 77, adjacently to the battery box 77. Therefore, even in the case wherein the area of the part where the battery box 77 is mounted on the horizontal part cross member 18 is small, forward tilting of the battery box 77 can be prevented by the fuel tank 40. As a result, the working required for mounting or assembling operation can be enhanced.

In addition, the cooling water pipes 42, 42 for the engine E are disposed rearwardly of the battery box 77, adjacent to the battery box 77. Therefore, even in the case wherein the area of the part where the battery box 77 is mounted on the horizontal part cross member 18 is small, rearwardly tilting of the battery box 77 can be prevented by the cooling water pipes 42, 42. Accordingly, the working required for mounting or assembling operation can be enhanced.

In addition, the above-described embodiment shows merely one mode of application of the present invention, and the invention is not to be restricted to the above embodiment.

While a configuration wherein the wiring 107 is passed inside the bulging part 89 in the manner of traversing the bulging part 89 in the vehicle width direction has been described in the above embodiment, the present invention is not restricted to this configuration. For example, a configuration may be adopted wherein a pipe or pipes for conducting a working fluid, cooling water or the like, in place of the wiring 107, may be passed inside the bulging part 89 in the manner of traversing it in the vehicle width direction.

In addition, while a configuration wherein rearward tilting of the battery box 77 is prevented by the cooling water pipes 42, 42 has been described in the above embodiment, this is not restrictive. A configuration may be adopted wherein the battery box 77 is put in contact with the cylinder head 32 of the engine E, whereby the battery box 77 is prevented from tilting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage part structure for a saddle vehicle, including a storage box and a battery box formed as a body separate from the storage box and fixed to the storage box, comprising:
    said battery box being disposed under the storage box;
    a cross member constituting a body frame, said cross member being provided under the battery box with the battery box being mounted on the cross member; and
    a contact part of the battery box for contact with the cross member is formed as a bulging part bulging to below a battery box bottom wall contacted by a battery with a piping or wiring being passed inside the bulging part in the manner of traversing the bulging part in a vehicle width direction;
    wherein the battery box includes a guide part fitted to the storage box from outside of the storage box, the guide part being slanted down toward a center of the battery box.

2. The storage part structure for the saddle vehicle according to claim 1, wherein the storage box and the battery box are fixed by a fastening member and fixation by the fastening member can be performed from the side of an opening in the storage box.

3. The storage part structure for the saddle vehicle according to claim 2, and further including a positioning part for positioning the battery box and the cross member.

4. The storage part structure for the saddle vehicle according to claim 2, wherein a fuel tank is disposed forwardly of the battery box adjacent to the battery box.

5. The storage part structure for a saddle vehicle according to claim 2, and further including an engine is disposed rearwardly of the battery box adjacently to the battery box.

6. The storage part structure for the saddle vehicle according to claim 1, and further including a positioning part for positioning the battery box and the cross member.

7. The storage part structure for the saddle vehicle according to claim 6, wherein a fuel tank is disposed forwardly of the battery box adjacent to the battery box.

8. The storage part structure for the saddle vehicle according to claim 1, wherein a fuel tank is disposed forwardly of the battery box adjacent to the battery box.

9. The storage part structure for a saddle vehicle according to claim 1, and further including an engine is disposed rearwardly of the battery box adjacently to the battery box.

10. A storage part structure for a saddle vehicle comprising:
    a storage box;
    a battery box formed as a body separate from the storage box and fixed to the storage box with said battery box being disposed under the storage box; and
    a cross member constituting a body frame, said cross member being provided under the battery box, and said battery box being mounted on the cross member;
    a contact part of the battery box for contacting with the cross member is formed as a bulging part bulging to below a battery box bottom wall contacted by a battery with a piping or wiring is passed inside the bulging part in the manner of traversing the bulging part in a vehicle width direction.

11. The storage part structure for the saddle vehicle according to claim 10, wherein the storage box and the battery box are fixed by a fastening member and fixation by the fastening member can be performed from the side of an opening in the storage box.

* * * * *